UNITED STATES PATENT OFFICE.

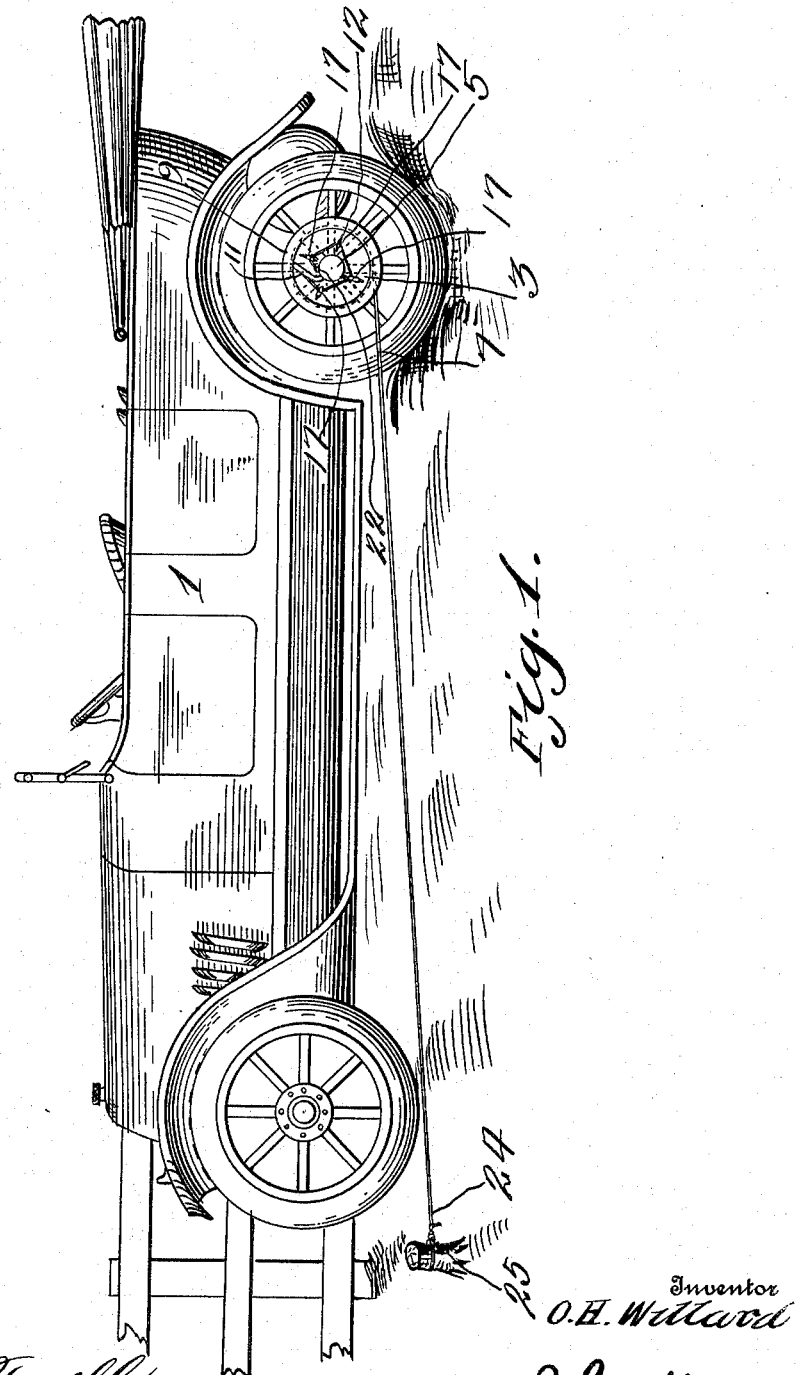

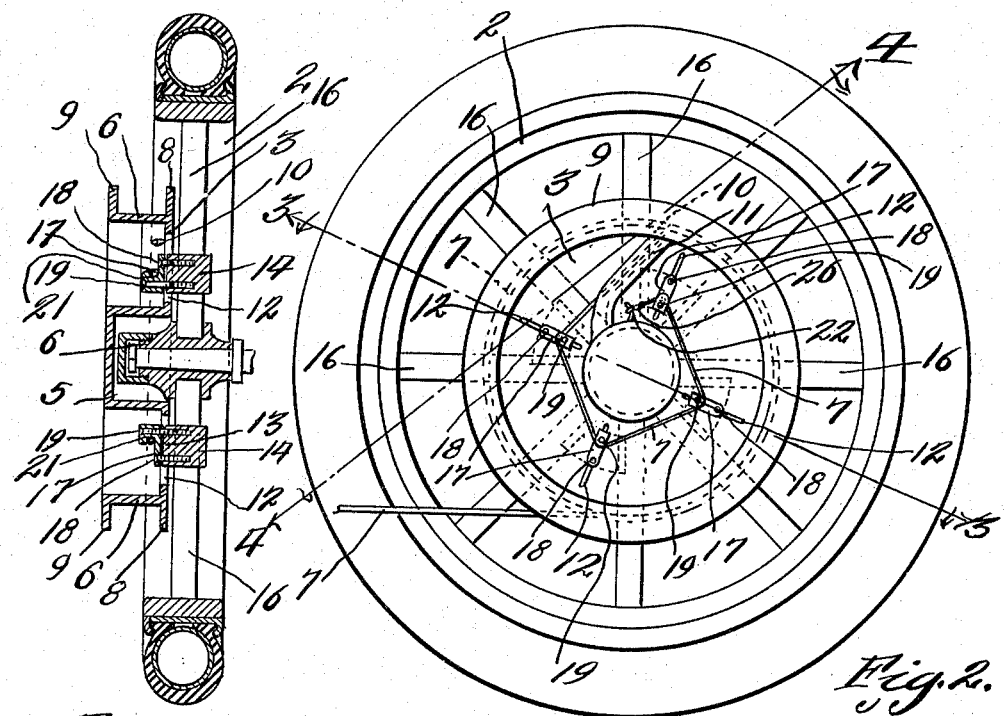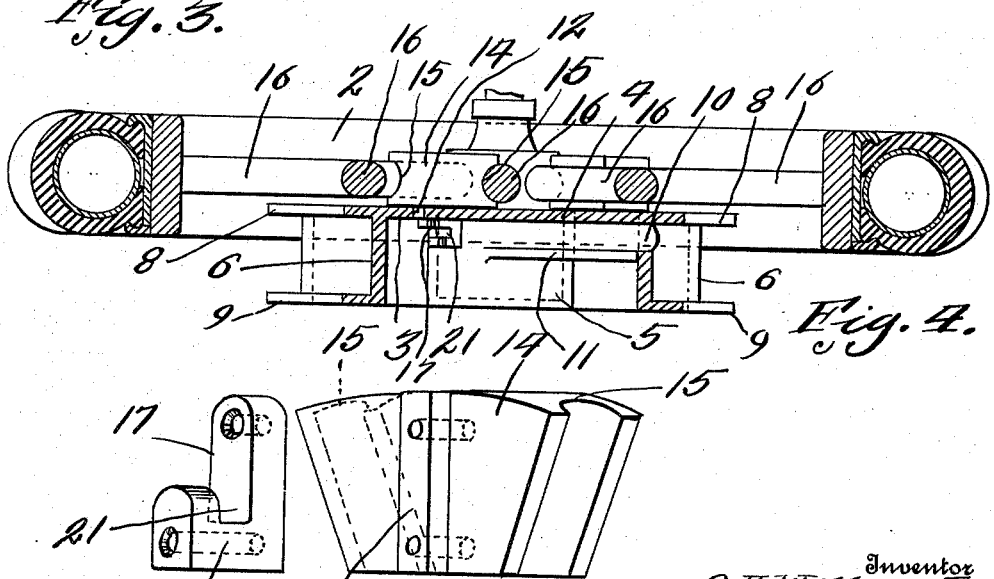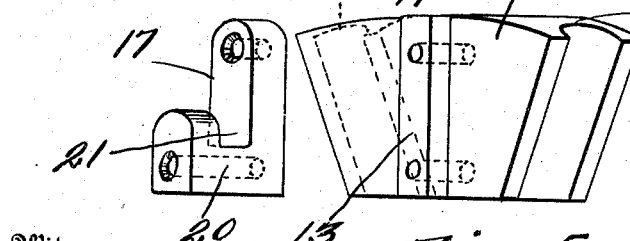

ORSON H. WILLARD, OF COTTAGE GROVE, OREGON.

EMERGENCY-WINDLASS FOR AUTOMOBILES.

1,156,648.   Specification of Letters Patent.   Patented Oct. 12, 1915.

Application filed April 8, 1915. Serial No. 19,955.

*To all whom it may concern:*

Be it known that I, ORSON H. WILLARD, a citizen of the United States, residing at Cottage Grove, in the county of Lane and State of Oregon, have invented a new and useful Emergency-Windlass for Automobiles; and I do hereby declare the following to be a full, clear, and exact description of the invention, such as will enable others skilled in the art to which it appertains to make and use the same.

This invention relates to an improved emergency draft windlass adapted for use in connection with automobiles, and an object of this invention is to provide a device of this nature adapted to be detachably connected to one of the driving wheels of the automobile and provided with a cable having a connection with a stake, tree or stump near the head of the automobile, so that when the driving wheel is in rotation and the machine is stuck in the mud, sand or snow, the cable between the stake and the windlass drum will automatically wind upon the drum, thereby causing the machine to pull itself on to the road bed over which it may be propelled in the customary manner.

Another object of the invention is to provide a draft windlass drum having improved means whereby the same may be detachably clamped to any size automobile driving wheel, regardless of the number of spokes therein.

Another object of the invention is the provision of a draft cable or rope, which acts to not only pull the automobile onto the road bed, but also constitutes means for drawing and holding the clamping devices of the windlass drum in clamping engagement with the driving wheel.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective showing an automobile in the act of pulling itself out of the mire or mud or the like. Fig. 2 is an enlarged side elevation of an automobile wheel showing the windlass drum as clamped thereto by virtue of the draft cable. Fig. 3 is a sectional view on line 3—3 of Fig. 2. Fig. 4 is a sectional view on line 4—4 of Fig. 2. Fig. 5 is an enlarged detail view of one of the clamps which is arranged between the spokes of the wheel.

Referring more especially to the drawings, 1 designates an automobile having the usual driving wheels 2, and 3 denotes the windlass draft drum, which is constructed of metal, and comprises an annular metal plate portion 4 formed with a socket 5 to receive the hub 6 of the wheel 2, when the plate portion 4 is arranged adjacent to the spokes of the wheel. Projecting laterally of the annular plate portion 4 is an annular flange 6, the outer circumference of which is engaged by the cable or rope 7, when the wheel and the drum are rotated as one body. The annular plate portion 4 of the drum is extended beyond the cylindrical flange 6 forming a cable retaining flange 8, which together with the retaining flange 9, holds the cable on the outer circumference of the cylindrical flange 6. The cylindrical flange 6 is provided with an opening 10, and extending from the opening 10 to the outer circumference of the wall of the socket 5 is a cable guide rib 11, with which the cable 7 engages before passing the opening 10 of the cylindrical flange 6. The annular plate portion 4 of the drum is provided with a plurality of guide slots 12, and radially and adjustably engaging through said slots are the ribs 13 of the substantially V-shaped or tapering blocks or clamps 14. The opposite tapering edges of the blocks 14 are grooved at 15, so as to engage adjacent spokes 16 of the wheel 2. Arranged adjacent the outer face of the circular plate portion 4 of the drum are clamp retainers 17, which are bolted at 18 and 19 to the blocks or clamps 14, so as to hold said clamp adjustable radially to the drum. These retainers 17 are provided with enlargements 20 having their outer ends grooved at 21. The outer cylindrical surface of the wall of the socket 5 is provided with a hook 22, to which said cable 7 is attached, as shown. In applying the emergency draft windlass, the drum is arranged adjacent the side of the wheel, as shown clearly in Figs. 1 and 2, so that the socket 5 will receive the hub of the wheel, and when so arranging the drum, it is essential to see that the clamps or blocks 14 are interposed between adjacent spokes as shown, after which the cable 7 is arranged in the grooves of the enlargement 20 and pass through the opening 10 of the drum, and its other end 24 is attached to a stake, tree or stump thereof, or the like as shown at 25, and subsequently to so arranging said parts, revoluble movement is imparted to the wheel 2, thereby causing the cable or rope to wind upon the drum, thereby pulling the automobile from the mire or mud. The automobile having pulled itself from the mud, the drum may be easily detached by detaching the snap hook 26 from the hook 22, so that the clamping members or blocks 14 may be thrown radially outwardly, permitting the drum to be detached from the wheel, together with the cable wound on the drum.

The invention having been set forth, what is claimed as new and useful is:—

1. An emergency draft windlass for the purpose described provided with a flexible draft member, comprising a drum having radially movable clamping means engaging between the spokes of an automobile wheel, said clamping means having elements to be engaged by said draft member to draw the clamping means in engagement with the spokes of the wheel for detachably clamping the drum to the wheel.

2. An emergency draft windlass for the purpose described provided with a flexible draft member comprising a drum having radially movable wedges to wedge between the spokes of an automobile wheel, said wedges having elements about which the draft member is designed to be wound for drawing the wedges toward the center of the drum to detachably clamp the drum to the wheel, said drum having an opening in its cylindrical wall through which the draft member may pass for winding upon the drum.

3. An automobile emergency draft windlass for the purpose set forth, comprising a windlass drum having a socket to engage the hub of an automobile wheel and provided with radial slots substantially V-shaped clamping members engaging said slots having grooves engaging and wedging between the spokes of the wheel, retainers for holding the clamping members movably in said slots, said retainers having enlargements provided with grooves, in which grooves a draft element winds for drawing the clamping members radially toward the hub for detachably clamping the drum to the wheel, said drum having an opening through which said draft element passes to wind upon the drum.

In testimony whereof I have signed my name to this specification in the presence of two subscribing witnesses.

ORSON H. WILLARD.

Witnesses:
HERMAN H. OAKES,
EMERSON B. GRABLE.

Copies of this patent may be obtained for five cents each, by addressing the "Commissioner of Patents, Washington, D. C."